US011474357B2

(12) United States Patent
Kim

(10) Patent No.: US 11,474,357 B2
(45) Date of Patent: Oct. 18, 2022

(54) AUGMENTED REALITY DISPLAY DEVICE

(71) Applicant: PRAZEN.CO., LTD., Gyeonggi-do (KR)

(72) Inventor: Heekyung Kim, Gyeonggi-do (KR)

(73) Assignee: PRAZEN.CO., LTD., Gyeonggi-do (KR)

( * ) Notice: Subject to any disclaimer, the term of this patent is extended or adjusted under 35 U.S.C. 154(b) by 0 days.

(21) Appl. No.: 16/636,885

(22) PCT Filed: May 17, 2019

(86) PCT No.: PCT/KR2019/005904
§ 371 (c)(1),
(2) Date: Oct. 7, 2020

(87) PCT Pub. No.: WO2019/221539
PCT Pub. Date: Nov. 21, 2019

(65) Prior Publication Data
US 2021/0397001 A1 Dec. 23, 2021

(30) Foreign Application Priority Data
May 17, 2018 (KR) .......................... 10-2018-0056717

(51) Int. Cl.
*G02B 27/01* (2006.01)
*H04N 13/344* (2018.01)

(52) U.S. Cl.
CPC ....... *G02B 27/0172* (2013.01); *H04N 13/344* (2018.05); *G02B 2027/0123* (2013.01); *G02B 2027/0174* (2013.01); *G02B 2027/0178* (2013.01)

(58) Field of Classification Search
CPC .............. G02B 27/0172; G02B 27/017; G02B 27/0081; G02B 2027/0123; G02B 2027/0178; G02B 17/08; G02B 7/182; H04N 13/344
See application file for complete search history.

(56) References Cited

U.S. PATENT DOCUMENTS

| 6,353,503 B1* | 3/2002 | Spitzer | G02B 27/017 |
| | | | 359/630 |
| 2014/0300966 A1* | 10/2014 | Travers | G03H 1/2205 |
| | | | 359/558 |
| 2016/0011419 A1* | 1/2016 | Gao | G02B 27/0172 |
| | | | 359/471 |

(Continued)

*Primary Examiner* — Xuemei Zheng
(74) *Attorney, Agent, or Firm* — IP & T Group LLP

(57) ABSTRACT

An augmented reality display device includes a micro-display; a relay lens array configured to be disposed at the rear stage of the micro-display and having a combination of two or more spherical or aspherical lenses; a combiner configured to be disposed at the rear stage of the relay lens array to project laterally an image light emitted from the relay lens array to a substrate to be described later and implement an ultra-short throw image using together with the relay lens array; a transparent or translucent substrate configured to form an image by projecting the image light transmitted from the combiner on the substrate; and a coating or film configured to be attached to one surface of a component part of the relay lens array, the combiner or the substrate so as to reflect, penetrate or refract the image light transmitted from the micro display.

15 Claims, 5 Drawing Sheets

(56) References Cited

U.S. PATENT DOCUMENTS

2016/0139412 A1* 5/2016 Sawada ............... G02B 17/002
  359/630
2017/0276946 A1* 9/2017 Yokoyama ............... G02B 5/10

* cited by examiner

AUGMENTED REALITY DISPLAY DEVICE

TECHNICAL FIELD

The present disclosure relates to an augmented reality display device, and more specifically, an augmented reality display device capable of obtaining a wider viewing angle and embodying a larger screen by employing a method of directly projecting an image in front of the eyes without using a wave guide or the like in displaying an image.

BACKGROUND

The content described in this section merely provides background information for this embodiment, and does not constitute a prior art.

Augmented reality technology is a technology that simultaneously shows the real world and a virtual image, and is a technology that overlappingly shows a virtual object on the real world. When a virtual image overlapping with a real-world object in real time has a very high sense of realism, the wearer can reach the extent that it is difficult to distinguish the real-world image from the virtually implemented image. Such a technology is also referred to mixed reality (MR). Augmented reality technology is a hybrid VR system that combines a real environment and a virtual environment, and research and development are currently actively conducted in various countries.

Augmented reality technology which has a concept to complement the real world with a virtual world, is implemented by superimposing and projecting information such as virtual images made of computer graphics onto the real environment. The virtual image serves to enhance the visual effect of a specific element of the real environment or to display information related to the real world. This augmented reality technology is applied to a display mounted on a wearable device such as glasses or a helmet. Devices such as augmented reality glasses not only include all the functions of the current smart phone, but also have a function of maximizing the visual information perception ability of the wearer. With the prospect that all computing interfaces will become augmented reality displays in the future, major global companies such as Apple, Google, and Facebook are making developments with huge investments.

While major global IT companies are making huge investments to preoccupy the market with the conviction of a wide application ranges and the potential for development of the augmented reality display device, the visible results are still insignificant. The problems of the existing augmented reality display device are as follows.

In the augmented reality display device, it is required to display a sufficiently large screen in the field of view for increased immersion and sufficient information transmission. In order to maximize the sense of reality and immersion, the field of view of the image output from the augmented reality glasses should be about 120 degrees. This corresponds to the field of view for both eyes of a person. However, when augmented reality glasses implement a wide field of view to increase the size of the screen output to the wearer, there is a trade-off relationship in which the size of the device increases accordingly. A recent trend of wearable devices, such as augmented reality glasses, is that the size of the device is reduced to such a degree that it does not differ much from conventional glasses (wearable devices). When the size of the device grows, the device will lose its merits as a wearable device and will be easily ignored by consumers. However, to date, the industry or academia related to augmented reality has not provided augmented reality display devices that are developed to be able to be worn comfortably while providing a wide field of view. This is due to the lack of optical design technology. Microsoft's HOLOLENS device, which is currently considered the most advanced augmented reality glasses, also has the field of view of 50 degrees.

In order to reduce the size of the display optical system included in the augmented reality display device produced by Microsoft or Magic Leap, an optical system of transmitting a micro-display image using a waveguide element has been used. The waveguide type optical system has a certain advantage in miniaturization of the device, but has a limitation in that the field of view cannot be physically increased to a level of 50 degrees or more. In an augmented reality display device including a waveguide type optical system, the field of view increases as the refractive index of the waveguide element increases physically, but the material price of the element increases as the refractive index of the element increases. Therefore, in order for the augmented reality display device including a waveguide-type optical system to have a wide field of view, high-refractive waveguide material is inevitably used, which leads to an increase in the price of the augmented reality display device as a whole. In addition, in the augmented reality display device including a wave guide type optical system, serious image deterioration occurs in the process of transmitting micro display image light using a wave guide. To compensate for this, the diffractive optical element or holographic optical element is patterned on the surface of the wave guide at the position where the micro-display image enters the wave guide and outputs light to the wearer's eye. The patterning procedure is very complicated and requires many processes. In addition, it causes the rise in parts prices.

As described above, although the problems with the existing augmented reality display device are obvious, the optical technology to date has not overcome the problems. That is, up to now, it is a reality that a compact optical module for augmented reality has not been developed which is necessary for a compact wearer to wear in front of the eye while implementing a wide field of view to maximize the immersion technically. This is also a major obstacle to the popularization of augmented reality display devices and related service industries.

DISCLOSURE

Technical Problem

One embodiment of the present invention has an object to provide an augmented reality display device that is lightweight while realizing a wide field of view by directly projecting a virtual environment on a projection surface without using a wave guide optical element.

One embodiment of the present invention has an object to provide an augmented reality display device, which provides a compact fit by miniaturizing the size of the optical module and the overall device accordingly, while providing a large screen with a wide field of view to maximize the immersion to the wearer.

In addition, one embodiment of the present invention has an object to provide an augmented reality display device that significantly reduces manufacturing costs by providing a virtual environment without the use of expensive optical elements.

SUMMARY

According to an aspect of the present embodiment, there is provided an augmented reality display device, which includes a micro-display; a relay lens array configured to be disposed at the rear stage of the micro-display and consisted of a combination of two or more spherical or aspherical lenses; a combiner configured to be disposed at the rear stage of the relay lens array to project laterally an image light emitted from the relay lens array to a substrate to be described later and implement an ultra-short throw image using together with the relay lens array; a transparent or translucent substrate configured to form an image by projecting the image light transmitted from the combiner on the substrate; and a coating or film configured to be attached to one surface of a component part of the relay lens array, the combiner or the substrate so as to reflect, penetrate or refract the image light transmitted from the micro display.

According to an aspect of the present embodiment, the relay lens array includes one or more prisms or mirrors as a light path changing element.

According to an aspect of the present embodiment, the combiner is a concave, convex or flat mirror, or a prism.

According to an aspect of the present embodiment, one surface of the component part included in the relay lens array, one component surface of the combiner or at least one surface of the substrate is aspherical or free-form.

According to an aspect of the present embodiment, the coating or film is a transparent or translucent film, which is attached to one surface of the component part(s) of the relay lens array, the combiner or the substrate.

According to an aspect of the present embodiment, the coating or film has a pattern structure which shows a holographic or diffractive optical effect.

According to an aspect of the present embodiment, the micro display is one of OLED, Micro LED, DMD and Laser beam scanned display.

According to an aspect of the present embodiment, the relay lens array includes liquid crystal or polymer which is switchable by electric field, or an Electric Kerr effect based element.

According to an aspect of the present embodiment, the relay lens array includes an optical element which utilizes a diffractive optical lens effect.

According to an aspect of the present embodiment, the relay lens array includes a lens embodied in one of Nematic liquid crystal utilizing a diffraction optical lens effect, Smectic liquid crystal, Ferroelectric liquid crystal, Cholesteric liquid crystal and Lyotropic liquid crystal.

According to an aspect of the present embodiment, the augmented reality display device is embodied one for each of the left and right eyes.

According to an aspect of the present embodiment, the augmented reality display device further includes a display driving board and display driving software which are time-divisionally driven in a manner that gives a binocular parallax between the left and right eyes, thereby realizing a 3D stereoscopic image.

According to an aspect of the present embodiment, the augmented reality display device is embodied in a plurality of each for the left and right eyes.

According to an aspect of the present embodiment, the augmented reality display device combines images projected through a plurality of devices installed for the left eye into one image to double the size of an image formed in the left eye and combines images projected through a plurality of devices installed for the right eye into one image to double the size of the image formed in the right eye.

According to an aspect of the present embodiment, the coating or film attached to the substrate is formed of a material whose transmittance is controlled electro-optically.

According to an aspect of the present embodiment, the material whose transmittance is controlled electro-optically is formed of a liquid crystal material.

According to an aspect of the present embodiment, the coating or film attached to the substrate is formed of one of Nematic liquid crystal, Smectic liquid crystal, Ferroelectric liquid crystal, Cholesteric liquid crystal and Lyotropic liquid crystal.

According to an aspect of the present embodiment, the augmented reality display device has a field of view equal to or more than 60 degrees.

Advantageous Effects

As described above, according to an aspect of the present disclosure, there is an advantage in that a device can be lightened while realizing a wide field of view by directly projecting a virtual environment on a projection surface without using a wave guide optical element.

According to an aspect of the present disclosure, there is an advantage in that while providing a large screen with a wide field of view to maximize the immersion of the wearer, the size of the optical module and thus the size of the entire device is miniaturized, thereby providing a compact fit.

In addition, according to an aspect of the present disclosure, there is an advantage of significantly reducing the manufacturing cost of the augmented reality display device, by providing a virtual environment without using expensive optical elements used for realizing augmented reality images.

DETAILED DESCRIPTION

Figure 1:
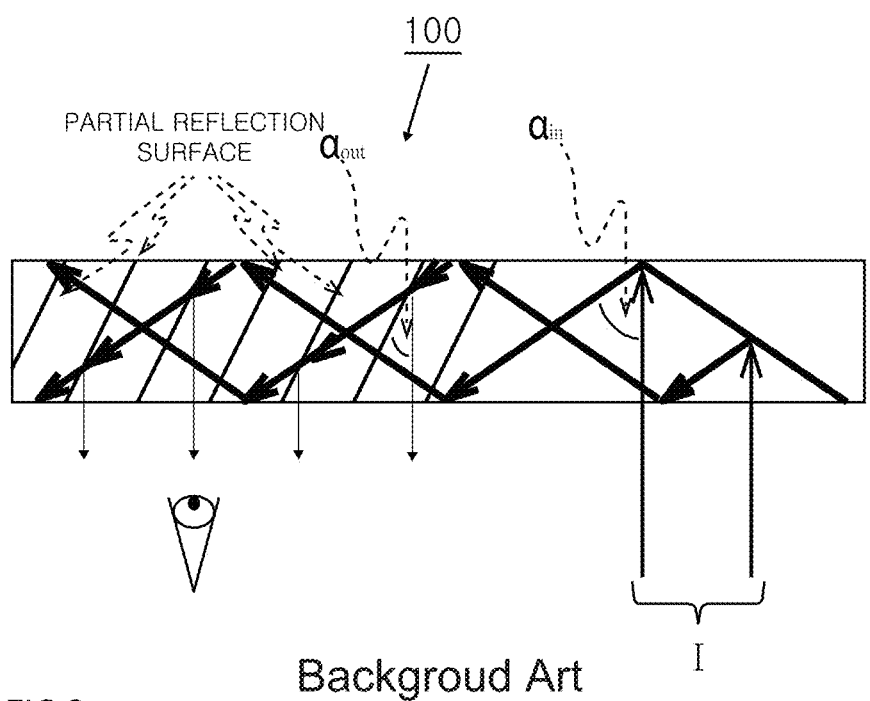
FIG. 1 is a view explaining the configuration and operation of a conventional wave guide optical element (LOE).

The present disclosure can be applied to various changes and can have various embodiments, and specific embodiments will be illustrated in the drawings and described in detail. However, this is not intended to limit the present disclosure to specific embodiments, and should be understood to include all modifications, equivalents, and substitutes included in the spirit and scope of the present disclosure. In describing each drawing, similar reference numerals are used for similar components.

Terms such as first, second, A, and B can be used to describe various components, but the components should not be limited by the terms. The terms are used only for the purpose of distinguishing one component from other components. For example, the first component may be referred to as a second component without departing from the scope of the present disclosure, and similarly, the second component may be referred to as a first component. The term and/or includes a combination of a plurality of related described items or any one of a plurality of related described items.

When an element is said to be "connected" or "interconnected" to another component, it is understood that other components may be directly connected to or connected to the other component, but other components may exist in the middle of them. On the other hand, when a component is said to be "directly connected" or "directly interconnected" to another component, it should be understood that no other component exists in the middle of them.

Terms used in the present disclosure are only used to describe specific embodiments, and are not intended to limit the present disclosure. Singular expressions include plural expressions unless the context clearly indicates otherwise. It should be understood that terms such as "include" or "have" in the present disclosure do not preclude the existence or addition possibility of features, numbers, steps, operations, components, parts, or combinations thereof described in the specification.

Unless otherwise defined, all terms used herein, including technical or scientific terms, have the same meaning as commonly understood by a person skilled in the art to which the present invention pertains.

Terms such as those defined in a commonly used dictionary should be interpreted as having meanings consistent with meanings in the context of related technologies, and should not be interpreted as ideal or excessively formal meanings unless explicitly defined in this application.

In addition, each configuration, process, process or method included in each embodiment of the present disclosure can be shared within a technically consistent range.

FIG. 1 is a view explaining the configuration and operation of a conventional wave guide optical element.

Referring to FIG. 1, a lightguide optical element (LOE) 100 includes a transparent wave guide and a mirror array which partially reflects light depending on an incident angle. The image (I) from the micro-display passes through a flat mirror and enters the light guide optical element 100. At this time, the flat mirror adjusts its angle so that the reflected image is not transmitted out of the wave guide but totally reflected inside the wave guide. The image that is totally reflected and proceeds in the wave guide passes through the mirror array, which may be transmitted through the mirror array or partially reflected from the mirror array depending on the angle incident on the mirror array. The reflected image is transmitted outside the wave guide and enters the wearers eyeball. When the wave guide is manufactured in the form of glasses and a mirror array is included inside the wave guide, the optical guide optical element can be implemented as a general glasses type head mounted display (HMD), which can be realized as a head mounted display advantageous in terms of weight, volume, and design. In addition, this type of glasses has an advantage of being able to obtain a wider field of view when compared to using a small micro-display, and to obtain a clear and bright image without chromatic aberration. However, when a light guide optical element is used, there is a limit to the size of an image implemented by the light guide optical element. That is shown in FIG. 2.

Figure 2:
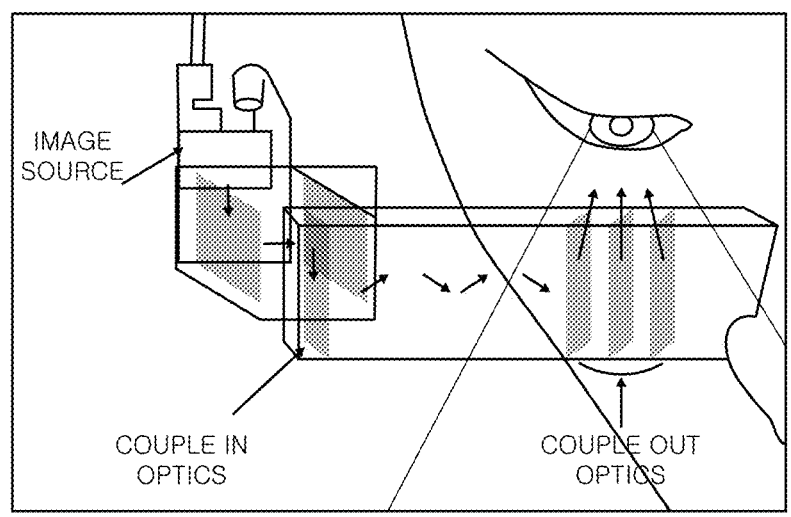
FIG. 2 is a view showing an image displayed on a viewer through a conventional wave guide optical element.

FIG. 2 is a view showing an image displayed on a viewer through a conventional wave guide optical element.

As shown in FIG. 2, it can be seen that the size of the image displayed on the viewer through the light guide optical element is very small. That is, since the image generated from the micro display, which is an image source, is totally reflected inside the wave guide and moves to the side, and the image moved to the side is reflected by the mirror and enters the human eyes, the image is limited to a place where the mirrors are installed. Thus, as shown in FIG. 2, it can be seen that the field of view is formed very narrowly as 25° to 40°. With such a narrow field of view, there is a limit to the user feeling realism and immersion. In fact, in order to provide a sense of reality and immersion to the wearer, the augmented reality display device must be capable of realizing a field of view of 100° or more, which is a human field of view.

Figure 3:
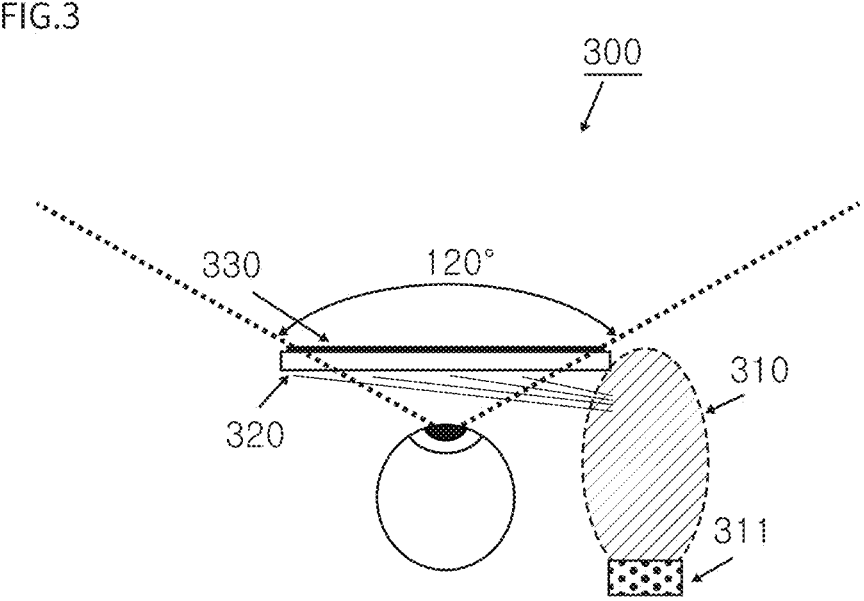
FIG. 3 is a view showing the configuration of an augmented reality display device according to an embodiment of the present disclosure.

FIG. 3 is a view showing the configuration of an augmented reality display device according to an embodiment of the present disclosure.

Referring to FIG. 3, the augmented reality glass device 300 according to an embodiment of the present disclosure includes an optical module 310 mounted on a leg portion of glasses, a combiner (not shown), a substrate 320 of glasses, and a selective reflection coating film 330 attached to one surface of the substrate.

Meanwhile, the optical module 310 includes a micro-display 311, a relay lens array or a reflection mirror. The relay lens array is comprised of one or more spherical lenses, and one or more aspherical or free-form lenses, and may include a liquid crystal lens, if necessary.

One or more spherical lenses, one or more aspherical or free-formed lenses constituting the relay lens array refer to components having a structure described by special geometrical formulas such as spherical, aspheric or free-formed surfaces. The relay lens array includes such components, thereby minimizing optical aberration and distortion of an image that may occur in the process in which the image light transmitted from the micro-display 311 passes through the substrate and is transmitted to the eye, maximizing the optical resolution (MTF) and miniaturizing the size of the AR glass optical module.

At least one surface of the reflection mirror or prism constituting the combiner may have a structure described by special geometrical formulas such as a spherical surface, an aspherical surface, or a free-formed surface, thereby minimizing the optical aberration and distortion of an image that may occur in the process in which the image light transmitted from the micro-display 311 passes through the substrate and is transmitted to the eye, maximizing the optical resolution (MTF) and miniaturizing the size of the AR glass optical module.

The micro-display 311 generates image light of augmented reality image, and the image light is incident on the relay lens module. The light incident on the lens module is modulated to minimize the optical aberration and distortion while passing through the lenses and path conversion elements constituting the module and transmitted to the combiner. The image light modulated in the process of passing through the relay lens array is secondarily modulated so that optical aberration and distortion are further reduced by concave or convex structures or geometric aspherical structures formed in the combiner while passing through the combiner made of a reflective mirror or prism. The image light passing through the combiner is reflected in the lateral direction of the combiner and projected onto the substrate located in front of the eyeball of the AR glass wearer.

The substrate 320 is made of a translucent or transparent material, and both sides of the substrate are made of aspherical or free-formed surfaces. The primary and secondary modulated image light through the relay lens and combiner is thirdly modulated through the substrate, further reducing optical aberration and distortion and maximizing optical resolution (MTF).

Modulation mentioned herein means a phenomenon in which properties such as wavelength, phase, or direction of propagation of light having a wave characteristic are changed by interaction with optical component elements. This modulation occurs sequentially as light passes through each optical element, and the final aberration reduction of the entire optical system is achieved by a combination of all optical elements such as a relay lens, a combiner, and a substrate constituting the present disclosure.

An selective reflection coating layer 330 is applied to the substrate 320, so that image light reaching the substrate passes through the substrate 320 and is partially reflected by the reflection coating layer 330. The image light reaching the substrate is partially reflected by the reflection coating layer 330, so that the wearer can not only see the object in front of the substrate, but also see the image reflected by the substrate 320 overlappingly and simultaneously.

A coating or film is applied on one of the components constituting the relay lens array, the combiner, and substrate. Accordingly, the relay lens array induces additional correction effects such as reflection, refraction, or diffraction of light while the image light emitted from the micro-display passes through each optical surface, effectively controlling aberration and distortion of light and increasing resolution of light.

As can be seen in FIG. 3, the image implemented by the augmented reality optical system is embodied with a field of view of 120° or more when viewed from the wearers point of view. The image implemented with the wide field of view is close to the human field of view, and the image reflected from the substrate covers almost all of the viewing, resulting in a very natural image. Since the image implemented with a wide field of view has a level similar to that of a person's natural field of view, the projected image covers the entire view field of the user, thereby maximizing realism and immersion. Although the field of view implemented by the optical system of the waveguide method in the art is about 50 degrees, the optical module according to an embodiment of the present disclosure can embody a field of view which is twice or more of it. In the present disclosure, a relay lens array, a combiner, a substrate, and an optical coating or film added to the surface of each optical element are configured to have an optical modulation process overlapped several times. Since the multi-modulation process allows the augmented reality image light emitted from the micro-display to minimize optical aberration and distortion and maximize optical resolution, the optical module can realize a wide field of view while minimizing the size.

Figure 4:
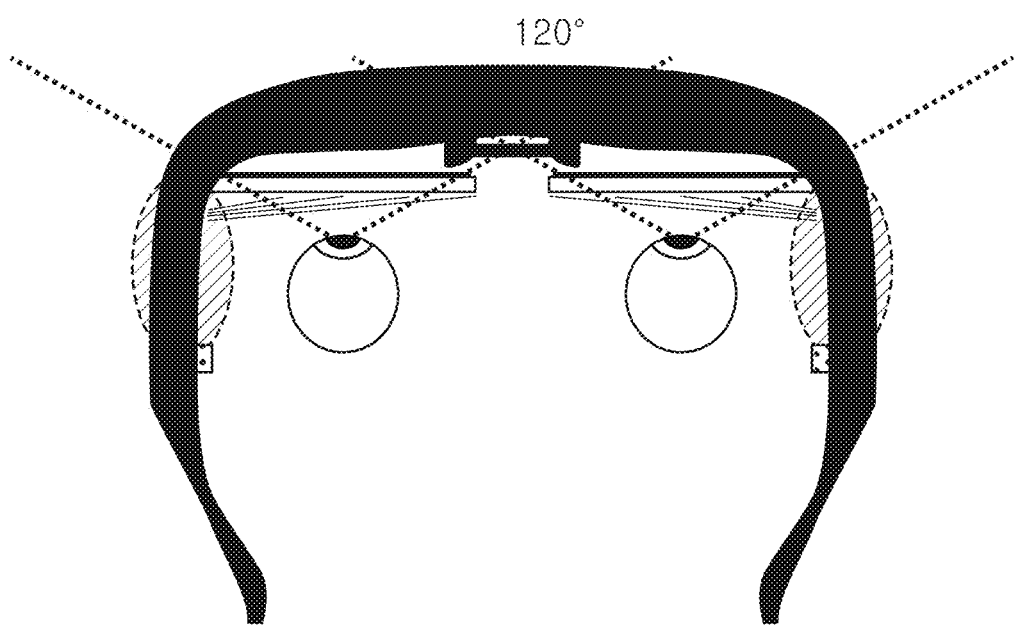
FIG. 4 is a view showing an embodiment in which the augmented reality display device according to an embodiment of the present invention is embodied in both eyes.

FIG. 4 is a view showing an embodiment in which the augmented reality display device according to an embodiment of the present invention is embodied in both eyes.

FIG. 4 shows an exemplary embodiment of an augmented reality display device in which the optical module shown in FIG. 3 is mounted on both legs of the glasses and an image is projected onto each of the binocular substrates. As described above, a field of view of 120° which is similar to a human field of view is implemented on each substrate, and a 3D stereoscopic image may be implemented by applying it to both eyes.

Figure 5:
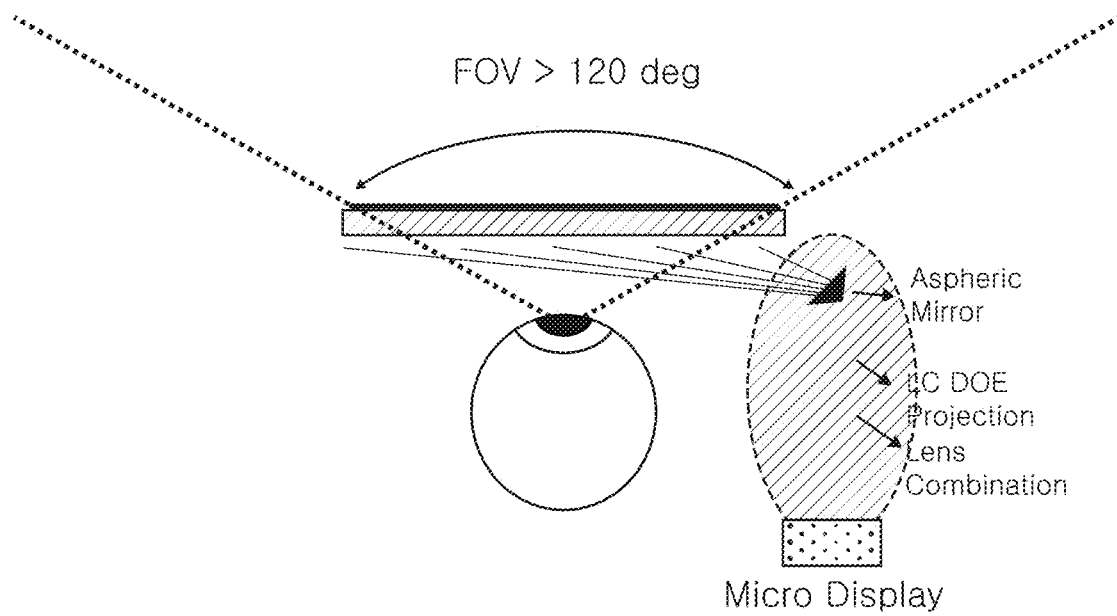
FIG. 5 is a view showing in detail the configuration of the augmented reality display device according to an embodiment of the present invention.

FIG. 5 is a view showing in detail the configuration of the augmented reality display device according to an embodiment of the present invention.

Referring to FIG. 5, the augmented reality display device according to an embodiment of the present disclosure includes a micro-display such as LCOS, OLED or DMD; a projection lens module or a switchable liquid crystal lens constituting the projection lens module; an aspherical mirror; and a flat-shaped semi-permeable substrate.

The liquid crystal lenses (LC lens) shown in FIG. 5 are made using liquid crystal as a material. The liquid crystal is an anisotropic material with optical anisotropy and dielectric anisotropy. When an electrode is placed on the liquid crystal material and an electric field is applied to the liquid crystal material to partially change its refractive index, a lens is formed whose depth of focus can be adjusted. When an electric field is applied to the liquid crystal lens, its refractive index can be changed so that it is possible to adjust the depth of focus of the liquid crystal lens.

In this way, the liquid crystal lens included in the combiner can more effectively realize the three-dimensional effect by adjusting the focal length, and can replace multiple spherical and/or aspherical lenses using a single lens.

As described above, the augmented reality display device includes a liquid crystal lens, so that the focal length can be adjusted to more effectively realize a three-dimensional effect, and a single lens can be used to replace multiple spherical and/or aspherical lenses.

The liquid crystal lens included in the relay lens array can be implemented in the form of a typical simple focus variable lens or a diffractive optical element (DOE). The liquid crystal lens constituting the relay lens array can be used as a replacement for lenses made of conventional glass or plastic materials. The liquid crystal lens makes it possible to have the optical refraction or diffraction function capable by a combination of a plurality of glass or plastic lenses with less lenses. When the plurality of glass or plastic lenses are replaced with the liquid crystal lens, it can be possible to make the optical system smaller, lighter, and less expensive.

Figure 6:
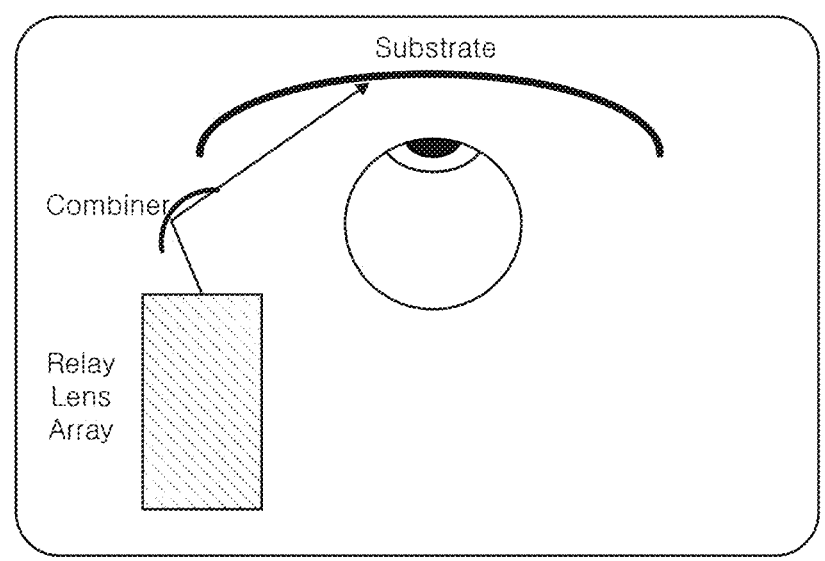
FIG. 6 is a view illustrating an exemplary embodiment in which an augmented reality display device according to an embodiment of the present disclosure is embodied in a single eye.

FIG. 6 is a view illustrating an exemplary embodiment in which an augmented reality display device according to an embodiment of the present disclosure is embodied in a single eye.

Referring to FIG. 6, the augmented reality display device may have a structure in which image light from the relay lens array passes through a combiner reflection mirror and is projected onto the substrate.

Figure 7:
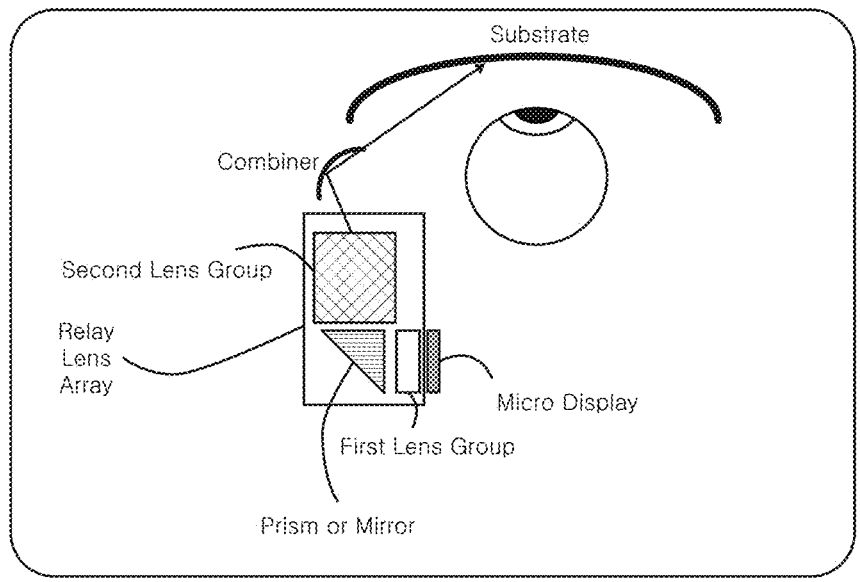
FIG. 7 is a view showing the configuration of an optical module according to a first embodiment of the present disclosure.

FIG. 7 is a view showing the configuration of an optical module according to a first embodiment of the present disclosure.

Referring to FIG. 7, the relay lens array includes a spherical lens, an aspheric lens, an optical path changing mirror or prism, and an optical coating formed on the surface of each component. The combiner is a concave mirror or a convex mirror. A reflective mirror and a substrate, which act as combiners, can have spherical, aspherical, or free-form structures to improve the optical performance of the display and reduce the size of the optical system. The surfaces of the combiner reflective mirror and substrate may be equipped with an optical coating or optical film that contributes to improving the optical performance of the display and reducing the size of the optical system.

Figure 8:
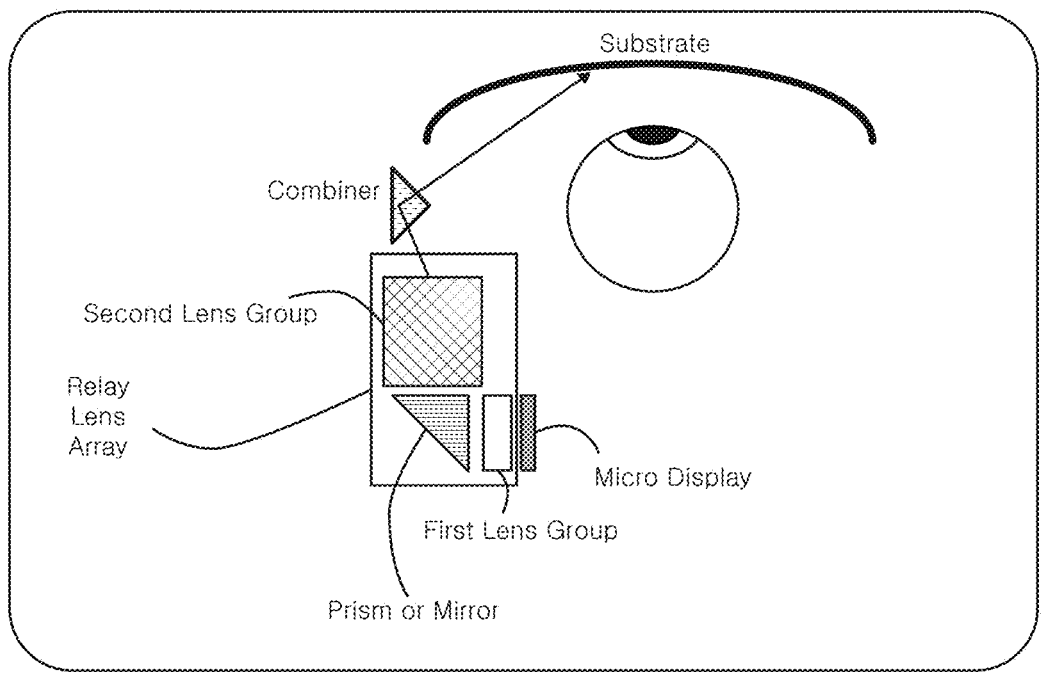
FIG. 8 is a view showing the configuration of an optical module according to a second embodiment of the present disclosure.

FIG. 8 is a view showing the configuration of an optical module according to a second embodiment of the present disclosure.

Referring to FIG. 8, the relay lens array includes a spherical lens, an aspheric lens, a light path changing mirror or a prism, and an optical coating formed on the surface of each component. The combiners shown in FIG. 8 consists of a prism with a geometric structure. At least one surface of the prism, the mirrors and substrates that acts as a combiner may have a spherical, aspheric or free-form surface to improve the optical performance of the display and reduce the size of the optical system. An optical coating or optical film can be installed on the surface of the reflective mirror and substrate to contribute to improving the optical performance of the display and reducing the size of the optical system.

Figure 9:
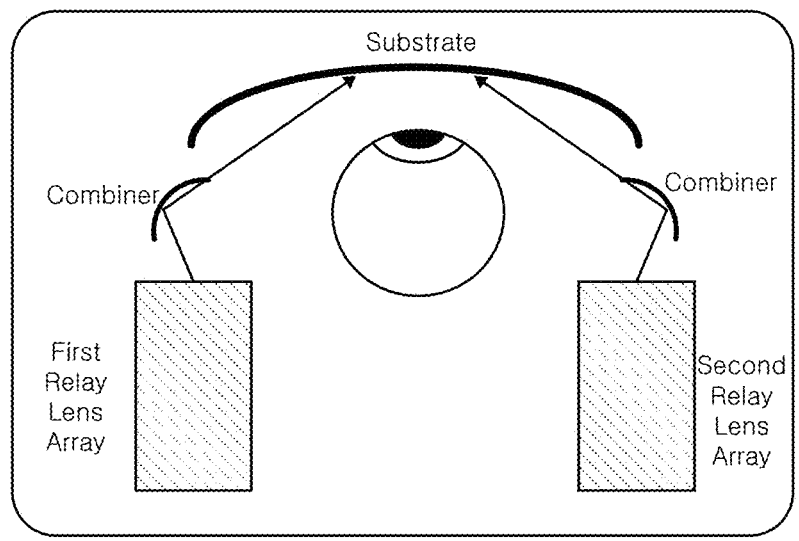
FIG. 9 is a view showing an exemplary embodiment in which the augmented reality display device according to the first embodiment of the present disclosure is embodied in both eyes.

FIG. 9 is a view showing an exemplary embodiment in which the augmented reality display device according to the first embodiment of the present disclosure is embodied in both eyes.

Referring to FIG. 9, the augmented reality display device includes two optical systems, and can double the size of the image formed on the left side by combining the images projected on the substrate into one image.

Figure 10:
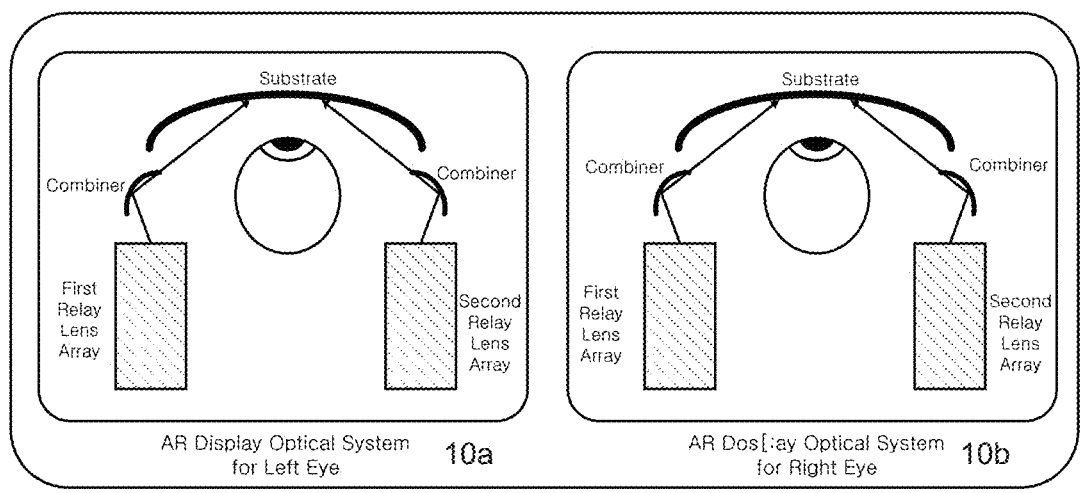
FIG. 10 is a view showing an exemplary embodiment in which the augmented reality display device according to the second embodiment of the present disclosure is embodied in both eyes.

FIG. 10 is a view showing an exemplary embodiment in which the augmented reality display device according to the second embodiment of the present disclosure is embodied in both eyes.

Referring to FIG. 10, images projected on each board located in front of the left and right eyes are combined into a single image for each eye by a software application (contained in AR Display Optical System 10a for the left eye and in AR Display Optical System 10b for the right eye) to drive the augmented reality glasses or a Head Mounted Display (HMD) device, so that the image formed in the left and right eyes is doubled in size. AR Display Optical System 10a for the left eye and in AR Display Optical System 10b each include the above noted display driving board and display driving software which are time-divisionally driven in a manner that gives a binocular parallax between the left and right eyes, thereby realizing a 3D stereoscopic image.

The above description is illustrative of the technical ideas of this embodiment, and a person with ordinary skill in the art may be able to make various modifications and variations without departing from the essential characteristics of this embodiment. Accordingly, these embodiments are not intended to limit the technical ideas of the embodiments but to illustrate them, and the scope of the technical ideas of the embodiments is not limited by the embodiments. The protection scope of the embodiments should be interpreted by the claims below, and all technical ideas within the scope equivalent thereto should be interpreted as being included in the scope of the embodiments.

CROSS-REFERENCE TO RELATED APPLICATION

When the present patent application claims priority under U.S. Patent Act 119 (a) (35 U.S.C. § 119 (a)) for patent application No. 10-2018-0056717 filed in Korea on May 17, 2018, All of the contents are incorporated into the present patent application by reference. In addition, when the present patent application claims priority for the same reasons as above for countries other than the United States, all of the contents are incorporated into the present patent application as a reference.

The invention claimed is:

1. An augmented reality display device, comprising:
   a micro-display;
   a relay lens array configured to be disposed at a rear stage of the micro-display and consisted of a combination of two or more spherical or aspherical lenses;
   a combiner disposed at the rear stage of the relay lens array and configured to project laterally image light emitted from the relay lens array to a substrate to produce an image on the substrate with the relay lens array,
   wherein the substrate is configured to form the image from the image light transmitted from the combiner on the substrate; and
   a coating or film configured to be attached to one surface of the substrate so as to reflect, penetrate or refract the image light transmitted from the micro display,
   wherein the coating or film attached to one surface of the substrate is formed of a material whose transmittance is controlled electro-optically.

2. The device of claim 1, wherein the relay lens array includes one or more prisms or mirrors as a light path changing element.

3. The device of claim 1, wherein the combiner is a concave, convex or flat mirror, or a prism.

4. The device of claim 1, wherein one surface of the component part included in the relay lens array, one component surface of the combiner or at least one surface of the substrate is aspherical or free-form.

5. The device of claim 1, wherein the micro display is one of OLED, Micro LED, DMD and Laser beam scanned display.

6. The device of claim 1, wherein the relay lens array includes liquid crystal or polymer which is switchable by electric field, or an Electric Kirr effect based element.

7. The device of claim 1, wherein the relay lens array includes an optical element which utilizes a diffractive optical lens effect.

8. The device of claim 7, wherein the relay lens array includes a lens embodied in one of Nematic liquid crystal utilizing a diffraction optical lens effect, Smectic liquid crystal, Ferroelectric liquid crystal, Cholesteric liquid crystal and Lyotropic liquid crystal.

9. The device of claim 1, further comprising a display driving board and display driving software which are time-divisionally driven in a manner that gives a binocular parallax between the left and right eyes, thereby realizing a 3D stereoscopic image.

10. The device of claim 9, wherein the augmented reality display device is embodied in a plurality of each for the left and right eyes.

11. The device of claim 10, wherein the augmented reality display device combines images projected through a plurality of devices installed for the left eye into one image to double the size of an image formed in the left eye and combines images projected through a plurality of devices installed for the right eye into one image to double the size of the image formed in the right eye.

12. The device of claim 1, wherein the material whose transmittance is controlled electro-optically is formed of a liquid crystal material.

13. The device of claim 1, wherein the coating or film attached to the substrate is formed of one of Nematic liquid crystal, Smectic liquid crystal, Ferroelectric liquid crystal, Cholesteric liquid crystal and Lyotropic liquid crystal.

14. The device of claim 1, wherein the augmented reality display device has a field of view equal to or more than 60 degrees.

15. The device of claim 1, wherein the augmented reality display device is embodied one for each of the left and right eyes.

\* \* \* \* \*